US011805819B1

(12) United States Patent
Spendlove

(10) Patent No.: US 11,805,819 B1
(45) Date of Patent: Nov. 7, 2023

(54) VAPORIZING SYSTEM WITH IMPROVED AIRFLOW AND HEATING SYSTEM INCORPORATED THEREIN

(71) Applicant: Brent Spendlove, Denver, CO (US)

(72) Inventor: Brent Spendlove, Denver, CO (US)

( * ) Notice: Subject to any disclaimer, the term of this patent is extended or adjusted under 35 U.S.C. 154(b) by 675 days.

(21) Appl. No.: 16/453,381

(22) Filed: Jun. 26, 2019

(51) Int. Cl.
| | |
|---|---|
| *A24F 40/10* | (2020.01) |
| *A24F 40/46* | (2020.01) |
| *A24F 40/48* | (2020.01) |
| *A24F 7/00* | (2006.01) |
| *H05B 3/44* | (2006.01) |
| *C04B 35/565* | (2006.01) |

(52) U.S. Cl.
CPC ............... *A24F 40/48* (2020.01); *A24F 7/00* (2013.01); *A24F 40/10* (2020.01); *A24F 40/46* (2020.01); *C04B 35/565* (2013.01); *H05B 3/44* (2013.01); *C04B 2235/3826* (2013.01)

(58) Field of Classification Search
CPC .......... A24F 40/48; A24F 40/40; A24F 40/20; A24F 40/00; A24F 40/46; A24F 40/10
See application file for complete search history.

(56) References Cited

U.S. PATENT DOCUMENTS

| | | | | |
|---|---|---|---|---|
| 4,069,819 A | * | 1/1978 | Valentini | A61M 15/0033 604/131 |
| 2014/0305449 A1 | * | 10/2014 | Plojoux | A24F 40/46 131/328 |
| 2014/0353856 A1 | * | 12/2014 | Dubief | A24F 40/485 261/128 |
| 2015/0122276 A1 | * | 5/2015 | Johnson | A24D 3/04 131/331 |
| 2016/0227838 A1 | * | 8/2016 | Johnson | A24F 40/46 |
| 2017/0208870 A1 | * | 7/2017 | Liu | A24F 40/485 |
| 2017/0325506 A1 | * | 11/2017 | Batista | A24F 40/465 |
| 2019/0083720 A1 | * | 3/2019 | Leadley | A61M 11/042 |

* cited by examiner

*Primary Examiner* — Alex B Efta
(74) *Attorney, Agent, or Firm* — Leavitt Eldredge Law Firm

(57) ABSTRACT

A heating assembly for use with a vaporizer, the heating assembly includes a bucket having an interior area configured to receive a vaporizing oil, the bucket having one or more legs extending therefrom to engage with spring clips of an electrical connection, the bucket composed of silicon carbide, and the bucket configured to receive and heat the oil.

5 Claims, 5 Drawing Sheets

VAPORIZING SYSTEM WITH IMPROVED AIRFLOW AND HEATING SYSTEM INCORPORATED THEREIN

BACKGROUND

1. Field of the Invention

The present invention relates generally to systems for recreational smoking and vaporizing, and more specifically, to a vaporizing system that includes an improved airflow system and heating system.

2. Description of Related Art

Smoking and vaporizing systems are well known in the art and are an effective means of recreational enjoyment. For example, FIG. 1 depicts a conventional smoking system 101 having a cigarette 103 and an ash tray 105. During use, the user will utilize the cigarette as desired and use the ash tray to collect waste. Additional systems further include electronic cigarettes and vaporizing devices that allow a user to create a vapor from an oil or the like for inhalation. The foregoing systems discussed above are limited in use. For example, they may be difficult in clean up and may not be efficient in creating a most desirable vapor for inhalation.

Accordingly, there is room for improvement. The present invention provides for a vaporizing system that incorporates an improved air circulation feature as well as an improved heating element that allows for an improved experience for the user.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
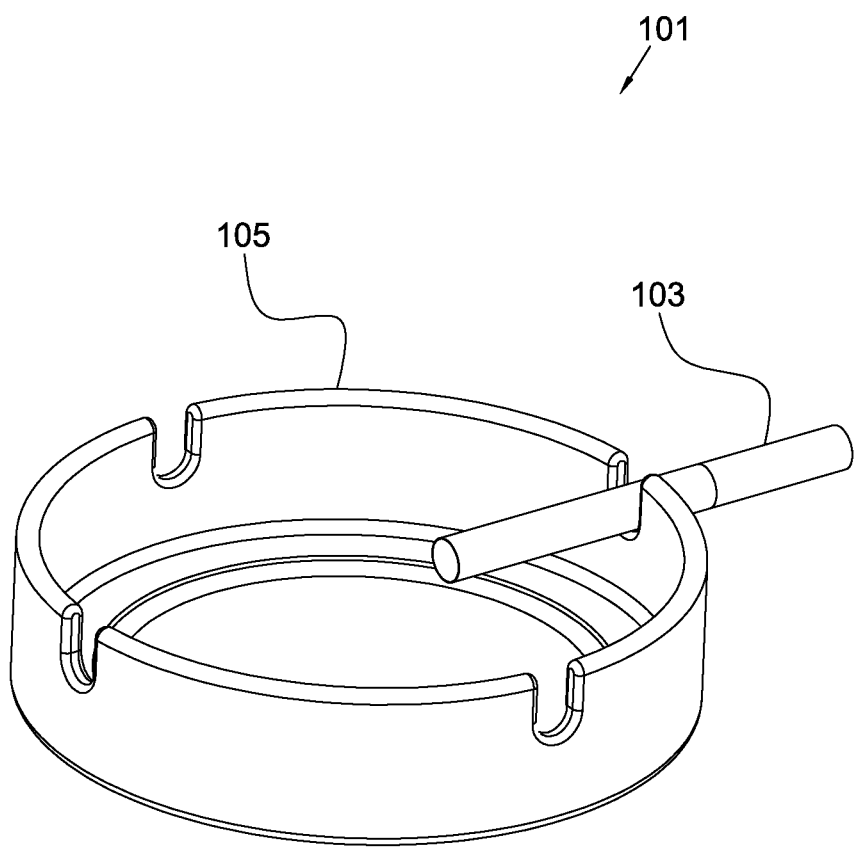
FIG. 1 is an isometric view of a common smoking system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional vaporizing systems. Specifically, the present invention incorporates a novel heating system that allows for quick and consistent heating to create vapor from an oil. In addition, the system incorporates a novel air flow system for improved mixing of the air, oil, and heat. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
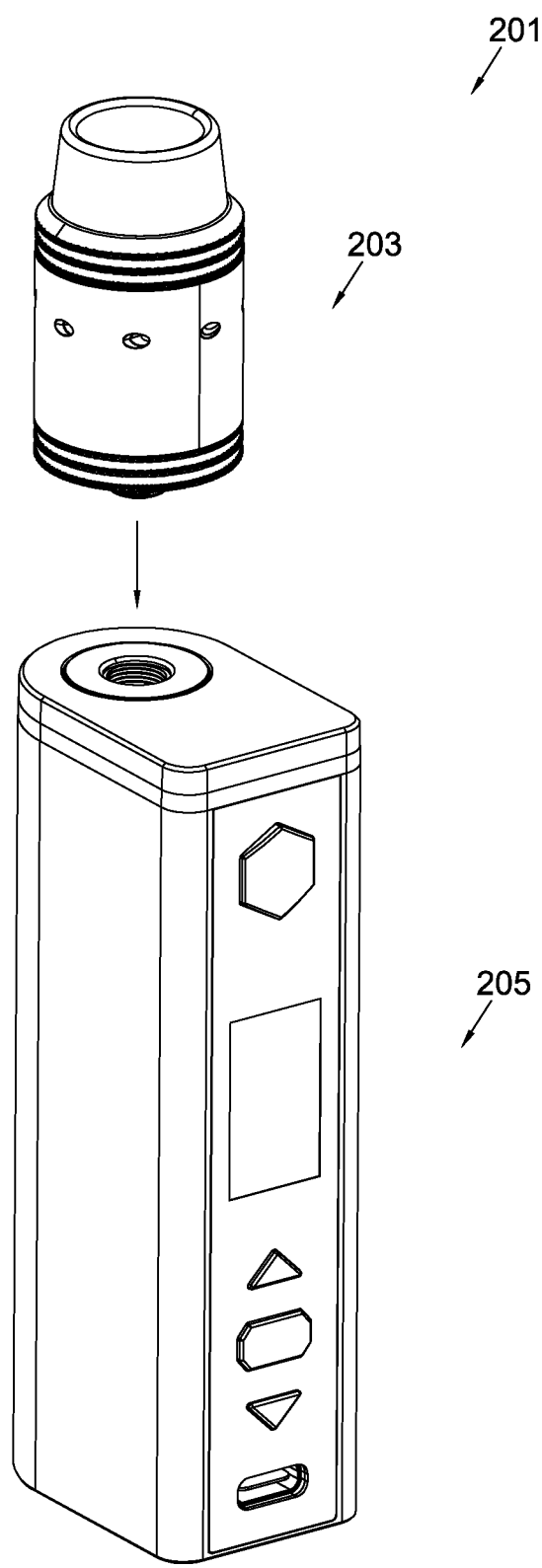
FIG. 2 is an isometric view of a vaporizing system in accordance with a preferred embodiment of the present application.

Referring now to the drawings wherein like reference characters identify corresponding or similar elements throughout the several views, FIG. 2 depicts an isometric view of a vaporizing system 201 in accordance with a preferred embodiment of the present application. It will be appreciated that system 201 overcomes one or more of the above-listed problems commonly associated with conventional vaporizing systems.

In the contemplated embodiment, system 201 includes a power source 205 with a plurality of controls and configured to provide power to and engage with an atomizer 203. It should be appreciated that the power source 205 can vary based on aesthetical, functional, or manufacturing considerations.

Figure 3:
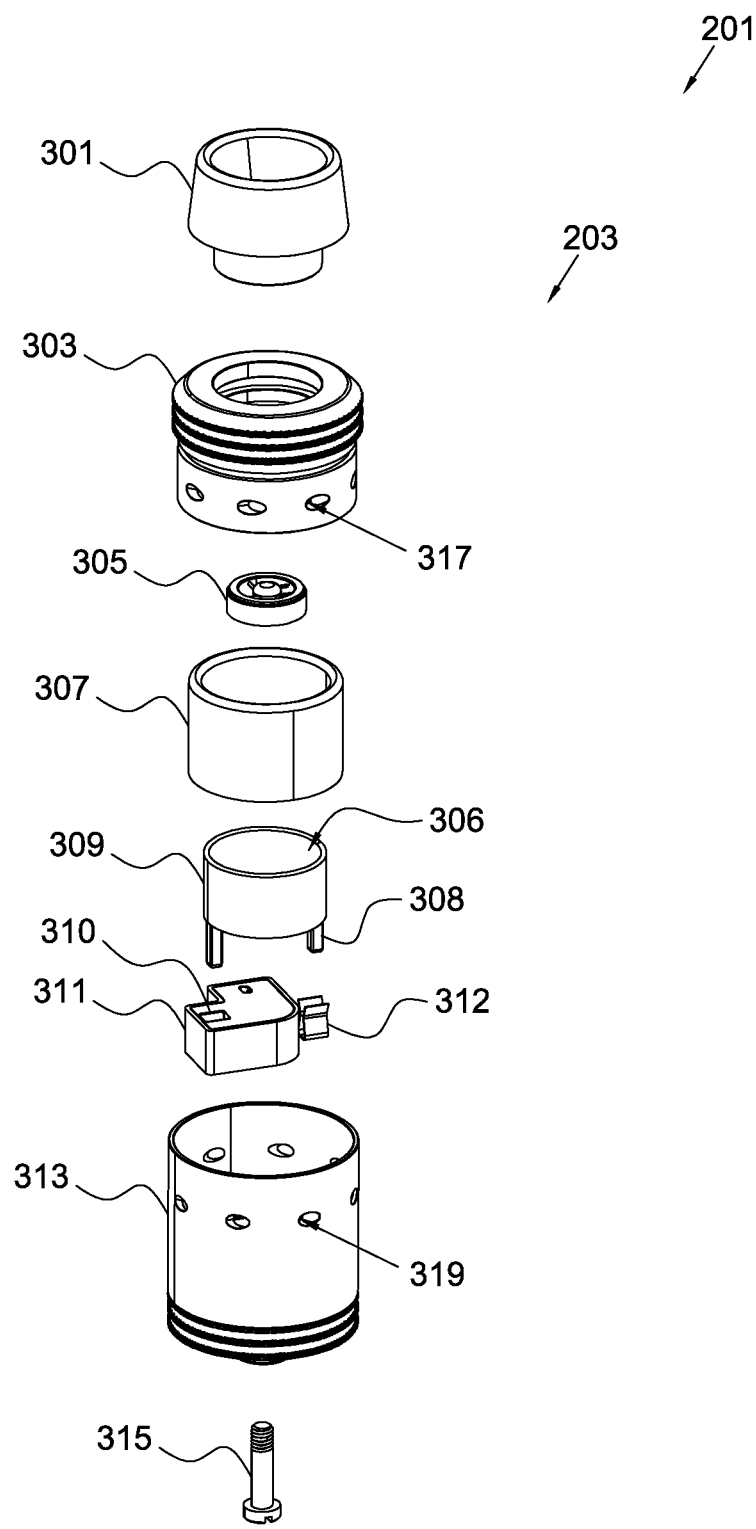
FIG. 3 is a disassembled view of an atomizer of FIG. 2.
Figure 4:
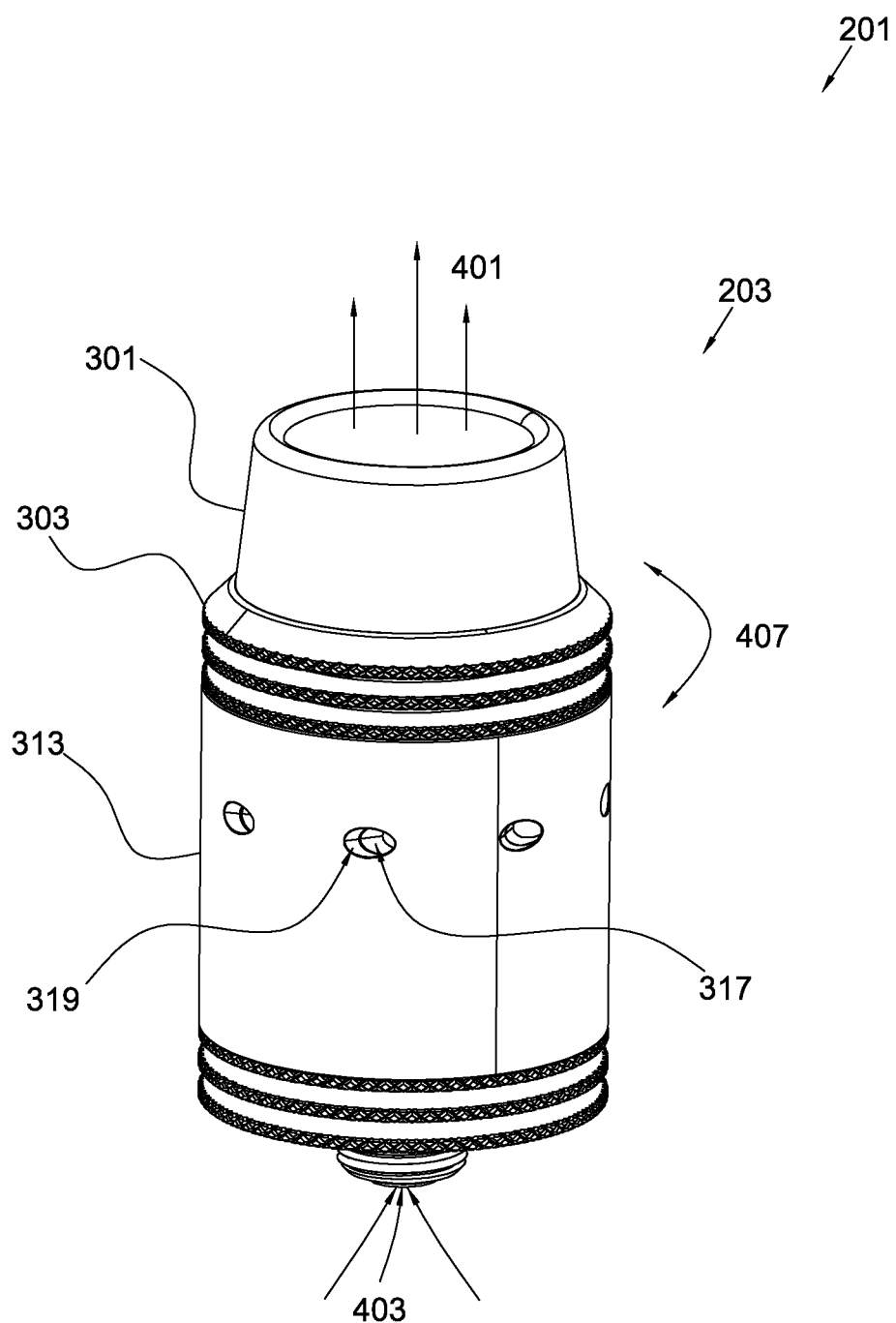
FIG. 4 is an assembled view of the atomizer of FIG. 3.
Figure 5:
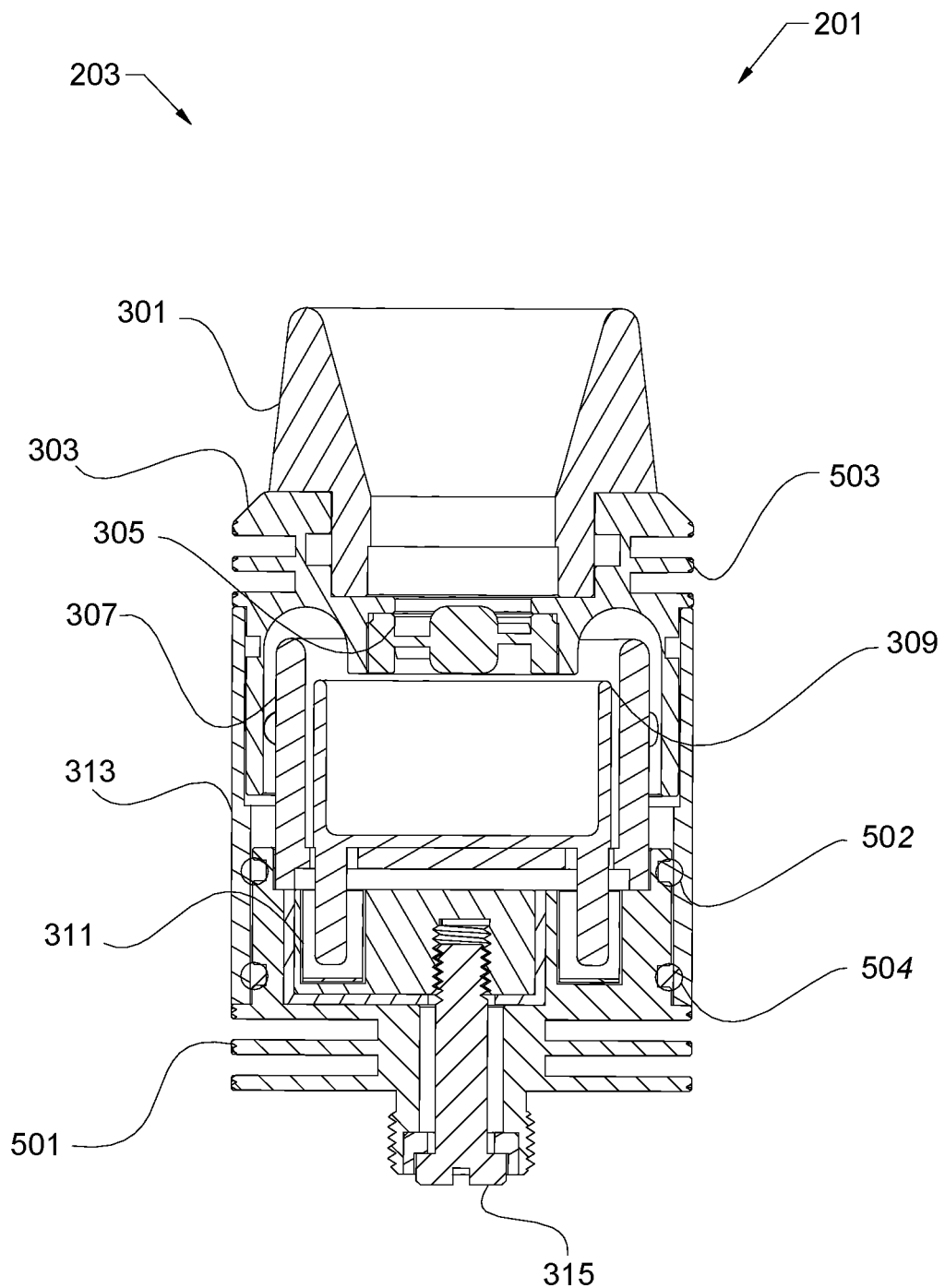
FIG. 5 is a cross sectional view of the atomizer of FIG. 2.

In FIGS. 3-5, the features of the atomizer 203 are shown for clarity. As shown, system 201 includes an atomizer base 213 extending from a bottom end to a top end, the atomizer base having a first plurality of tapered or vectored openings 319 extending through a thickness of the base. System 201 further includes an atomizer top 303 having a second plurality of tapered openings 317 extending through a thickness of the atomizer top. As shown best in FIGS. 4 and 5, the base and top are configured to slidingly engage, such that the first and second plurality of openings align, and such that the user can alter the alignment by rotating the top relative to the base, thereby directly changing the airflow. As further shown, the atomizer base 213 can include one or more O-rings 502, 504 that secure between the top and the base when secured together.

System 201 further includes a chamber 307 configured to sit within the atomizer base such that a gap is created between an exterior surface of the chamber 307 and an interior surface of top. This gap is configured to further allow for air flow around the chamber 307.

As shown, the system 201 can further include a stationary fan 305 positioned within the atomizer top and further configured to aid in airflow.

It should be appreciated that one of the unique features believed characteristic of the present application is the airflow created within the chamber. It should be appreciated and understood that the invention comprises a 360 degree vortex air inlet that spins air around the chamber. This feature is achieved the plurality of openings, which are vectored to direct airflow as air is pulled into the device. The user can adjust, as shown with arrow 407, as desired to increase or decrease the airflow. Further, the fan 305 which is positioned near the vapor outlet furthers this effect. This feature acts to increase vaporization efficiency by mixing the air, oil, and heat more evenly. Further, this feature prevents excess heat in the vapor, thereby making the vapor smoother and more enjoyable for the user.

System 201 further includes a mouthpiece 301 configured to engage with the top and emit vapor 401 therethrough and a connection 315 configured to connect to the power source 205, such that a heating element receives heat to vaporize the oil.

System 201 yet further includes a heating assembly that includes a bucket 309 with an interior area 306 and one or more legs 308. The heating assembly further includes an electrical connection 311 with one or more spring loaded clips 310, 312, wherein the one or more spring loaded clips 310, 312 are configured to receive the one or more legs 308. During use, an oil is placed in interior area 306 of the bucket 309 and the bucket 309 is engaged with the electrical connection 311 via the legs and spring loaded clips. The electrical connection 311 is further connected to connection 315, thereby being configured to receive power from the power source.

It should be appreciated that another unique feature believed characteristic of the present invention is that in the preferred embodiment, the bucket 309 is composed of silicon carbide. It should be appreciated that silicon carbide is a semiconductor and is configured to heat up directly, thereby eliminating the need for an additional heating element to vaporize the oil. It should be appreciated that the electrical resistance of silicon carbide changes as it heats up, and by monitoring this change in resistance, the system can be configured to allow the user to select a desired temperature.

The lack of an additional heating element outside of the bucket allows for the bucket to heat up faster and more efficiently than conventional heating systems. Further, the high thermal conductivity of the silicon carbide material provides a means for the bucket to cool down quickly, which prevents user burns. In addition, the silicon carbide will not emit dangerous and toxic materials when heated. Yet further, the bucket can be easily cleaned, as the bucket can be removed and cleaned, and then replaced into the system. Further, the bucket allows for consistent and uniform heating which can provide an improved vapor. Yet further, the silicon carbide material is nonstick, which further aids for cleaning and maintenance.

As shown in FIG. 4, during use, power 403 is pulled from the power source, wherein the connection 315 supplies the power to the electrical connection and the bucket 309. The bucket will then heat up, thereby turning the oil into a vapor 401 to be emitted through the mouthpiece 301. In some embodiments, a bottom 501 and top 503 knurled heat sink can further be included to diffuse heat within the system, in addition this style of heat sink allows for a grip for the user.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A vaporizing system, comprising:
    an atomizer base extending from a bottom end to a top end, the atomizer base having a first plurality of tapered openings extending through a thickness of the atomizer base;
    an atomizer top having a second plurality of tapered openings extending through a thickness of the atomizer top, the atomizer top forming a hollow circular body, the second plurality of tapered openings are positioned at an angle relative to the hollow circular body such that airflow through the second plurality of tapered openings create a vortex within the hollow circular body;
    a chamber configured to sit within the atomizer base;
    a heat bucket configured to fit within the chamber, the heat bucket having a body with a leg extending therefrom, the heat bucket is configured to store an oil;
    a stationary fan positioned within the atomizer top, the stationary fan directs air to the hollow circular body, wherein vanes of the stationary fan block the oil from the heat bucket from entering into the atomizer top; and
    an electrical connection having a spring clip, the spring clip is configured to engage with the leg of the heat bucket, the spring clip creates electrical conductivity between the electrical connection and the heat bucket;
    wherein the first plurality of tapered openings aligns with the second plurality of tapered openings;
    wherein the atomizer top is rotationally engaged with the atomizer base such that a user can align and misalign the first plurality of openings and the second plurality of openings;
    wherein the atomizer base, atomizer top, and chamber are configured such that there is a gap between the chamber and an interior wall of the atomizer top and an exterior wall of the chamber; and
    wherein air is pulled into the chamber via the first and second plurality of openings and circulate throughout the chamber.

2. The system of claim 1, wherein the atomizer base further comprises a knurled heat sink.

3. The system of claim 1, wherein the atomizer top further comprises a knurled heat sink.

4. The system of claim 1, further comprising:
    a mouthpiece configured to engage with the atomizer top, the mouthpiece in gaseous communication with the chamber.

5. The system of claim 1, wherein the heat bucket is composed of silicon carbide.

* * * * *